US012669620B2

(12) United States Patent
Wang et al.

(10) Patent No.: US 12,669,620 B2
(45) Date of Patent: Jun. 30, 2026

(54) METHOD AND APPARATUS FOR MEASURING RELATIVE POSITION OF SPACECRAFT BASED ON GNSS DIFFERENCE

(71) Applicant: Tsinghua University, Beijing (CN)

(72) Inventors: Zhaokui Wang, Beijing (CN); Yingkai Cai, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 18/874,971

(22) PCT Filed: Jun. 19, 2023

(86) PCT No.: PCT/CN2023/100990
§ 371 (c)(1),
(2) Date: Dec. 13, 2024

(87) PCT Pub. No.: WO2024/016922
PCT Pub. Date: Jan. 25, 2024

(65) Prior Publication Data
US 2026/0003081 A1 Jan. 1, 2026

(30) Foreign Application Priority Data

Jul. 20, 2022 (CN) .......................... 202210855431.0

(51) Int. Cl.
*G01S 19/44* (2010.01)
*G01S 19/37* (2010.01)
(52) U.S. Cl.
CPC .............. *G01S 19/44* (2013.01); *G01S 19/37* (2013.01)
(58) Field of Classification Search
CPC ...................................................... G01S 19/44
See application file for complete search history.

(56) References Cited

U.S. PATENT DOCUMENTS 5,825,326 A 10/1998 Semler et al.
2011/0273328 A1 11/2011 Parker

FOREIGN PATENT DOCUMENTS

CN 103728641 A 4/2014
CN 106990424 A 7/2017
(Continued)

OTHER PUBLICATIONS

Y. Gao et al., An optimized fast ambiguity search method for ambiguity resolution on the fly, Proceedings of Position, Location and Navigation Symposium—PLANS '96, p. 246-253 (Year: 1996).*

(Continued)

*Primary Examiner* — Resha Desai
*Assistant Examiner* — Fred H Mull
(74) *Attorney, Agent, or Firm* — Crowell & Moring LLP; Thomas E. Williams

(57) ABSTRACT

The present application provides a method and an apparatus for measuring a relative position of a spacecraft based on GNSS difference. The method includes: acquiring a first long-wave observation combination and a second long-wave observation combination; performing a double-difference ambiguity of whole cycles search according to a pseudo-range double-difference linear equation and a carrier double-difference equation, and determining N first ambiguities of whole cycles to be detected of the first long-wave observation combination and M second ambiguities of whole cycles to be detected of the second long-wave observation combination; determining a first ambiguity of whole cycles and a second ambiguity of whole cycles that satisfy a preset ambiguity of whole cycles condition; and then determining a short-wave double-difference ambiguity of whole cycles to measure the relative position of the spacecraft.

8 Claims, 4 Drawing Sheets

(56)                    References Cited

FOREIGN PATENT DOCUMENTS

| | | | | | |
|---|---|---|---|---|---|
| CN | 109116394 | A | | 1/2019 | |
| CN | 109581452 | A | | 4/2019 | |
| CN | 109932735 | A | * | 6/2019 | |
| CN | 113064195 | A | | 7/2021 | |
| CN | 113655504 | A | * | 11/2021 | ............. G01S 19/37 |
| CN | 113655510 | A | | 11/2021 | |
| CN | 115327595 | A | | 11/2022 | |

OTHER PUBLICATIONS

J.A. Cheng et al., Aided integer ambiguity resolution algorithm, PLANS 2004. Position Location and Navigation Symposium, p. 740-745 (Year: 2004).*

D. Zhao et al., Cycle Slip Detection during High Ionospheric Activities Based on Combined Triple-Frequency GNSS Signals, Remote Sens. 2019, 11, 250, 20 pages (Year: 2019).*

E. Kim, GNSS Precise Relative Positioning Using a Priori Relative Position in a GNSS Harsh Environment, Sensors 2021, 21, 1355, 19 pages (Year: 2021).*

English Translation of Liu (Instantaneous Ambiguity Resolution of Short Baselines Using BeiDou Triple Frequency Observations) (Year: 2025).*

English Translation of Shi (Relative Navigation Architecture Research for Aerospace Vehicle based on the Multimodal Measurement) (Year: 2025).*

Cai, Yingkai et al., "Real-time High-precision Baseline Measurement of Satellite Formation Flying Based on GNSS", Advances in Space Research, Science Direct, Elsevier, preprint submitted to Advances in Space Research, Feb. 1, 2024, 25 pages.

Capuano, Vincenzo et al., "On-board cooperative spacecraft relative navigation fusing SNSS with vision", Progress in Aerospace Sciences, Science Direct, Elseveier, Nov. 23, 2021, No. 128, 2022, 100761, 22 pages.

Liu, Yanyan, "Instantaneous Ambiguity Resolution of Short Baselines Using BeiDou Triple Frequency Observations", Geomatics and Information Science of Wuhan University, vol. 40, No. 2, Feb. 2015, pp. 209-213.

Shi, Qingfeng et al., "Relative Navigation Architecture Research for Aerospace Vehicle based on the Multimodal Measurement", Computer Measurement & Control, vol. 26, No. 5, May 31, 2018, pp. 128-131.

International Search Report for international application No. PCT/CN2023/100990, mailed Sep. 11, 2023, in English and Chinese languages, 8 pages.

First Office Action for priority application No. CN 202210855431.0, issued Oct. 16, 2024, dated Oct. 14, 2024, in English and Chinese languages, 11 pages.

* cited by examiner

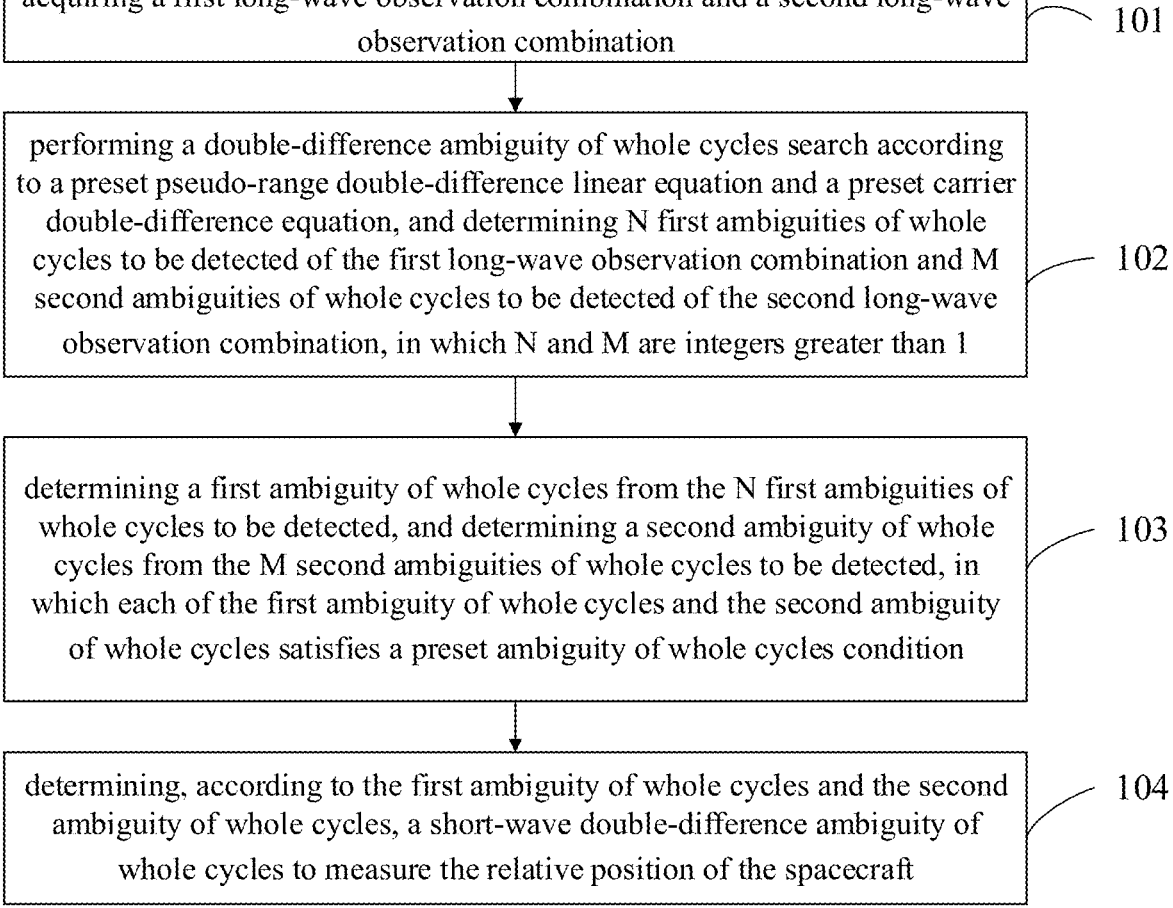

| acquiring a first long-wave observation combination and a second long-wave observation combination | 101 | performing a double-difference ambiguity of whole cycles search according to a preset pseudo-range double-difference linear equation and a preset carrier double-difference equation, and determining N first ambiguities of whole cycles to be detected of the first long-wave observation combination and M second ambiguities of whole cycles to be detected of the second long-wave observation combination, in which N and M are integers greater than 1 — 102 determining a first ambiguity of whole cycles from the N first ambiguities of whole cycles to be detected, and determining a second ambiguity of whole cycles from the M second ambiguities of whole cycles to be detected, in which each of the first ambiguity of whole cycles and the second ambiguity of whole cycles satisfies a preset ambiguity of whole cycles condition — 103 determining, according to the first ambiguity of whole cycles and the second ambiguity of whole cycles, a short-wave double-difference ambiguity of whole cycles to measure the relative position of the spacecraft — 104

Fig. 1

500 apparatus for measuring a relative
position of a spacecraft based on GNSS
difference acquisition module    501 first determination module    502 second determination module    503 measurement module    504

601    602    603 processor    memory    communicati
on interface bus    610

METHOD AND APPARATUS FOR MEASURING RELATIVE POSITION OF SPACECRAFT BASED ON GNSS DIFFERENCE

CROSS-REFERENCE TO RELATED APPLICATIONS

The present application is a National Stage of International Application No. PCT/CN2023/100990 filed on Jun. 19, 2023, which claims priority to Chinese Patent Application No. 202210855431.0 filed on Jul. 20, 2022, both of which are hereby incorporated by reference in their entireties.

TECHNICAL FIELD

The present application relates to the field of aviation technology, and particularly to a method and an apparatus for measuring a relative position of a spacecraft based on GNSS difference.

BACKGROUND

With the continuous development of the space science and technology, there are various types of space missions and the complexity is increasing, resulting in a distributed space system (DSS). However, Formation Flight is a typical working mode of the distributed space system, in which real-time and accurate relative position measurement is an input condition of formation control and a basic premise of maintaining and reconstructing formation configuration, avoiding collision and ensuring safety. At present, the relative position measurement of global navigation satellite system (GNSS) cannot simultaneously meet the real-time performance and high-precision requirement for measuring the relative position of the spacecraft.

SUMMARY

Embodiments of the present application provide a method and an apparatus for measuring a relative position of a spacecraft based on GNSS difference, so as to solve the technical problem that the existing method for measuring the relative position cannot simultaneously meet the real-time and high precision requirements for measuring the relative position of the spacecraft.

In a first aspect, the embodiments of the present application provide a method for measuring a relative position of a spacecraft based on GNSS difference, and the method includes:

acquiring a first long-wave observation combination and a second long-wave observation combination;

performing a double-difference ambiguity of whole cycles search according to a preset pseudo-range double-difference linear equation and a preset carrier double-difference equation, and determining N first ambiguities of whole cycles to be detected of the first long-wave observation combination and M second ambiguities of whole cycles to be detected of the second long-wave observation combination, in which N and M are integers greater than 1;

determining a first ambiguity of whole cycles from the N first ambiguities of whole cycles to be detected, and determining a second ambiguity of whole cycles from the M second ambiguities of whole cycles to be detected, in which each of the first ambiguity of whole cycles and the second ambiguity of whole cycles satisfies a preset ambiguity of whole cycles condition; and determining, according to the first ambiguity of whole cycles and the second ambiguity of whole cycles, a short-wave double-difference ambiguity of whole cycles to measure the relative position of the spacecraft.

In a second aspect, the embodiments of the present application provide an apparatus for measuring a relative position of a spacecraft based on GNSS difference, and the apparatus includes:

an acquisition module configured to acquire a first long-wave observation combination and a second long-wave observation combination;

a first determination module configured to perform a double-difference ambiguity of whole cycles search according to a preset pseudo-range double-difference linear equation and a preset carrier double-difference equation, and determine N first ambiguities of whole cycles to be detected of the first long-wave observation combination and M second ambiguities of whole cycles to be detected of the second long-wave observation combination, in which N and M are integers greater than 1;

a second determination module configured to determine a first ambiguity of whole cycles from the N first ambiguities of whole cycles to be detected, and determine a second ambiguity of whole cycles from the M second ambiguities of whole cycles to be detected, in which each of the first ambiguity of whole cycles and the second ambiguity of whole cycles satisfies a preset ambiguity of whole cycles condition; and a measurement module configured to determine a short-wave double-difference ambiguity of whole cycles to measure the relative position of the spacecraft according to the first ambiguity of whole cycles and the second ambiguity of whole cycles.

In a third aspect, the embodiments of the present application provide an electronic device, and the device includes:

a processor and a memory storing programs or instructions;

in which the processor, when executing the programs or the instructions, implements the above method.

In a fourth aspect, the embodiments of the present application provide a readable storage medium having programs or instructions stored thereon, in which the programs or instructions, when executed by a processor, implement the above method.

In a fifth aspect, the embodiments of the present application provide a computer program product, in which instructions in the computer program product, when executed by a processor of an electronic device, cause the electronic device to perform the above method.

The method and the apparatus for measuring the relative position of the spacecraft based on GNSS difference according to the embodiments of the present application can acquire the first long-wave observation combination and the second long-wave observation combination; perform the double-difference ambiguity of whole cycles search according to the preset pseudo-range double-difference linear equation and the preset carrier double-difference equation, and determine the N first ambiguities of whole cycles to be detected of the first long-wave observation combination and the M second ambiguities of whole cycles to be detected of the second long-wave observation combination; determine the first ambiguity of whole cycles and the second ambiguity of whole cycles that satisfy the preset ambiguity of whole cycles condition from the N first ambiguities of whole cycles to be detected and the M second ambiguities of whole cycles to be detected, respectively; and determine, according to the first ambiguity of whole cycles and the second ambiguity of whole cycles, the short-wave double-difference ambiguity of whole cycles to measure the relative position of the space-craft. In this way, the carrier wavelength may be expanded by linear combination using multiple frequency observations provided by GNSS, and ambiguities of whole cycles of the first long-wave observation combination and the second long-wave observation combination after the carrier wavelength is expanded may be searched, so that the search space for the ambiguity of whole cycles can be sparse, the search workload can be reduced, the calculation time can be reduced, and the short-wave double-difference ambiguity of whole cycles can be obtained to precisely measure the relative position of the spacecraft, and thus the real-time performance and high-precision requirement for measuring the relative position of the spacecraft can be met simultaneously.

BRIEF DESCRIPTION OF THE DRAWINGS

In order to more clearly illustrate the technical solutions of the embodiments of the present application, the drawings to be used in the embodiments of the present application will be briefly introduced below. For those of ordinary skill in the art, other drawings can be obtained based on these drawings without inventive effort.

FIG. 1 shows a schematic flow diagram of a method for measuring a relative position of a spacecraft based on GNSS difference according to an embodiment of the present application;

DETAILED DESCRIPTION

Figure 2:
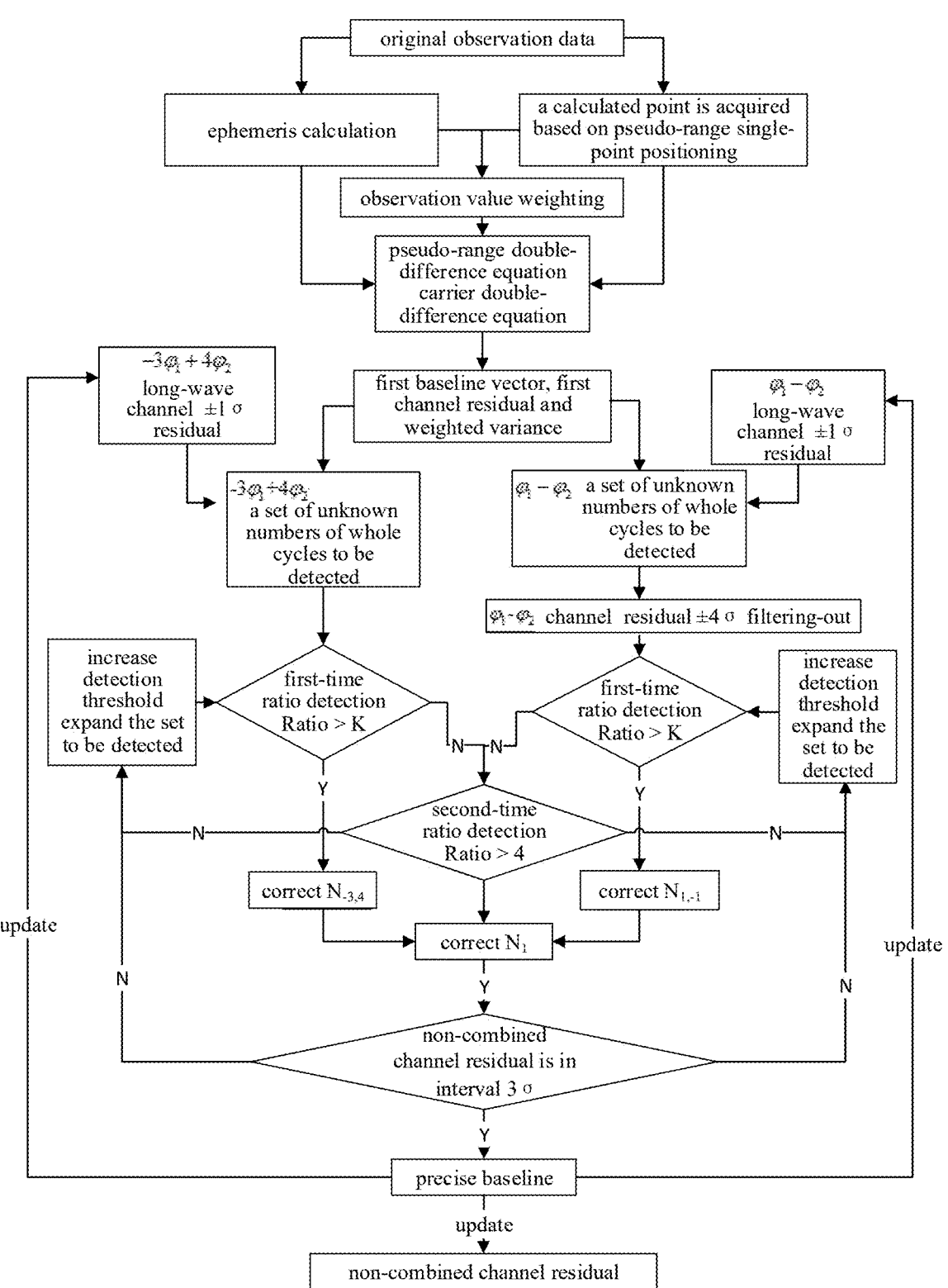
FIG. 2 shows a flow diagram of one scenario embodiment of a method for measuring a relative position of a spacecraft based on GNSS difference according to an embodiment of the present application.

Features and exemplary embodiments of various aspects of the present application will be described in detail below. In order to make the objects, technical solutions and advantages of the present application clearer, the present application is further described in detail below with reference to the accompanying drawings and specific embodiments. It should be understood that the specific embodiments described herein are only used to explain the present application, but not to limit the present application. For those skilled in the art, the present application can be implemented without some of these specific details. The following description of the embodiments is merely to provide a better understanding of the present application by illustrating the examples of the present application.

It should be noted that, in the present application, the relational terms, such as first and second, are used merely to distinguish one entity or operation from another entity or operation, without necessarily requiring or implying any actual such relationships or orders for these entities or operations. Moreover, the terms "comprise", "include", or any other variants thereof, are intended to represent a non-exclusive inclusion, such that a process, method, article or device including a series of elements includes not only those elements, but also other elements that are not explicitly listed or elements inherent to such a process, method, article or device. Without more constraints, the elements following an expression "comprise/include . . . " do not exclude the existence of additional identical elements in the process, method, article or device that includes the elements.

In order to solve the problems of the prior art, the embodiments of the present application provide a method and an apparatus for measuring a relative position of a spacecraft based on Global Navigation Satellite System (GNSS) difference. The method for measuring the relative position of the spacecraft based on GNSS difference according to an embodiment of the present invention is described below.

FIG. 1 shows a schematic flow diagram of a method for measuring a relative position of a spacecraft based on GNSS difference according to an embodiment of the present application. As shown in FIG. 1, the method for measuring the relative position of the spacecraft based on GNSS difference may include:

Step 101: acquiring a first long-wave observation combination and a second long-wave observation combination;

Step 102: performing a double-difference ambiguity of whole cycles search according to a preset pseudo-range double-difference linear equation and a preset carrier double-difference equation, and determining N first ambiguities of whole cycles to be detected of the first long-wave observation combination and M second ambiguities of whole cycles to be detected of the second long-wave observation combination, in which N and M are integers greater than 1;

Step 103: determining a first ambiguity of whole cycles from the N first ambiguities of whole cycles to be detected, and determining a second ambiguity of whole cycles from the M second ambiguities of whole cycles to be detected, in which each of the first ambiguity of whole cycles and the second ambiguity of whole cycles satisfies a preset ambiguity of whole cycles condition; and Step 104: determining, according to the first ambiguity of whole cycles and the second ambiguity of whole cycles, a short-wave double-difference ambiguity of whole cycles to measure the relative position of the spacecraft.

Specific implementations of the above steps will be described in detail below.

In the embodiment of the present application, the method for measuring the relative position of the spacecraft based on GNSS difference according to the embodiments of the present application can acquire the first long-wave observation combination and the second long-wave observation combination; perform the double-difference ambiguity of whole cycles search according to the preset pseudo-range double-difference linear equation and the preset carrier double-difference equation, and determine the N first ambiguities of whole cycles to be detected of the first long-wave observation combination and the M second ambiguities of whole cycles to be detected of the second long-wave observation combination; determine the first ambiguity of whole cycles and the second ambiguity of whole cycles that satisfy the preset ambiguity of whole cycles condition from the N first ambiguities of whole cycles to be detected and the M second ambiguities of whole cycles to be detected, respectively; and determine, according to the first ambiguity of whole cycles and the second ambiguity of whole cycles, the short-wave double-difference ambiguity of whole cycles to measure the relative position of the spacecraft. In this way, the carrier wavelength may be expanded by linear combination using multiple frequency observations provided by GNSS, and ambiguities of whole cycles of the first long-wave observation combination and the second long-wave observation combination after the carrier wavelength is expanded may be searched, so that the search space for the ambiguity of whole cycles can be sparse, the search workload can be reduced, the calculation time can be reduced, and the short-wave double-difference ambiguity of whole cycles can be obtained to precisely measure the relative position of the spacecraft, and thus the real-time performance and high-precision requirement for measuring the relative position of the spacecraft can be met simultaneously.

Specific implementations of the steps are described below.

In the embodiment of the present application, a pseudo-range double-difference linear equation and a carrier double-difference equation may be established in advance. Exemplarily, referenced may be made to a GNSS pseudo-range observation equation, the pseudo-range observation value $$C_A^i$$

of the L1 frequency point C/A code may be taken as an example, and a pseudo-range observation equation may be shown in equation (1):

$$C_A^j = \rho_A^i + c\delta_{t_S}^i + c\delta_{t_A} + \delta p^j + \delta_{ion}^i + \delta_{trop}^i + \delta p_{mul}^i + \delta_{rot}^i + \varepsilon_A \qquad (1)$$

in which $$\rho_A^i$$

may represent a distance between a receiver A and a navigation satellite i; $\delta_{t_A}$ is a deviation of the receiver A clock from the GPS time reference, c is the speed of light in a vacuum; $\delta p^i$ is an ephemeris error of the navigation satellite i;

$$\delta_{ion}^i$$

is a measurement deviation of the signal caused by ionosphere on the propagation path;

$$\delta_{trop}^i$$

is a measurement deviation of the signal caused by troposphere on the propagation path;

$$\delta p_{mul}^j$$

is a measurement deviation of the signal caused by the multi-path effect on the propagation path;

$$\delta_{rot}^i$$

is the deviation caused by the earth rotation effect; and $\varepsilon_A$ is the noise measured locally at the receiver A. The expression for the distance $$\rho_A^i$$

between the receiver A and the navigation satellite i may be as shown in equation (2):

$$\rho_A^i = \sqrt{(x_s^i - x_A)^2 + (y_s^i - y_A)^2 + (z_s^i - z_A)^2} \qquad (2)$$

in which $$(x_s^i \quad y_s^i \quad z_s^i)^T$$

is the accurate coordinate of the navigation satellite i in the Earth-Fixed Coordinate System at the time when the signal is transmitted; and $(x_A \ y_A \ z_A)^T$ is the accurate coordinate of the receiver A in the Earth-Fixed Coordinate System at the time when the signal arrives.

Referenced may be made to the carrier phase observation equation, $$\varphi_{A_1}^i \text{ and } \varphi_{A_2}^i$$

may respectively be the carrier phase measurement values of the navigation satellite i observed at the frequency points L1 and L2 received by the receiver A, and the expression of the carrier phase observation equation may be as shown in equation (3):

$$\lambda_1 \varphi_{A_1}^i = \rho_A^i - \lambda_1 N_{A_1}^i + \qquad (3)$$
$$c\delta_{t_S}^i + c\delta_{t_A} + \delta p^i - \delta_{ion_1}^i + \delta_{trop}^i + \delta p_{mul}^i + \delta_{rot}^i + \varepsilon_{A_1}$$
$$\lambda_2 \varphi_{A_2}^i = \rho_A^i - \lambda_2 N_{A_2}^i + c\delta_{t_S}^i + c\delta_{t_A} + \delta p^i - \delta_{ion_2}^i + \delta_{trop}^i + \delta p_{mul}^i + \delta_{rot}^i + \varepsilon_{A_2}$$

in which $$N_{A_1}^i \text{ and } N_{A_2}^i$$

are the ambiguities of whole cycles at the frequency points L1 and L2 respectively; $\lambda_1$ and $\lambda_2$ are carrier wavelengths;

$$\rho_A^i$$

may represent the distance between the receiver A and the navigation satellite i; $\delta_{t_A}$ is the deviation of the receiver A clock from the GPS time reference, c is the speed of light in the vacuum; $\delta p^i$ is the ephemeris error of the navigation satellite i;

$$\delta_{ion}^i$$

is the measurement deviation of the signal caused by ionosphere on the propagation path;

$$\delta_{trop}^i$$

is the measurement deviation of the signal caused by troposphere on the propagation path;

$$\delta p_{mul}^i$$

is the measurement deviation of the signal caused by the multi-path effect on the propagation path;

$$\delta_{rot}^i$$

is the deviation caused by the earth rotation effect; and $\varepsilon_A$ is the noise measured locally at the receiver A.

It may be understood that when the baseline formed by two receivers (i.e. observation points) is shorter, the influence of atmospheric error sources are strongly correlated. By observing differences between stations, the influence of the error sources can be greatly reduced, in which single differences between observation stations can eliminate the satellite clock difference and the satellite ephemeris error. The expression of the pseudo-range single-difference equation for synchronous observation of the navigation satellite $S_i$ by the receiver A and the receiver B may be as shown in equation (4):

$$C_A^i - C_B^i = \rho_A^i - \rho_B^i + c(\delta_{t_A} - \delta_{t_B}) + \delta\rho_{other} \tag{4}$$

The expression of the carrier phase single-difference equation for synchronous observation of the navigation satellite $S_i$ by the receiver A and the receiver B may be shown as in equation (5):

$$\lambda(\varphi_A^i - \varphi_B^i) = \rho_A^i - \rho_B^i - \lambda(N_A^i - N_B^i) + c(\delta_{t_A} - \delta_{t_B}) + \delta\rho_{other} \tag{5}$$

in which the approximate calculation points $(x_{A_0}\, y_{A_0}\, z_{A_0})^T$ and $(x_{B_0}\, y_{B_0}\, z_{B_0})^T$ may be obtained by a single-point positioning method. It can be understood that the three-axis error of the current GPS single-point positioning algorithm can be controlled within 10 m. In order to reduce the amount of calculation and save the calculation power, the higher-order term may be ignored, and only the constant term and the first-order term may be considered. It can also be understood that, for a baseline within 10 km, the direction cosine deviation of the same navigation satellite observed at two end points of a baseline is within $5e^{-4}$, and the influence on the baseline correction amount is not greater than 5 mm. Herein, the direction cosine at different end points can be approximated to obtain equation (6):

$$\rho_A^i - \rho_B^i = \rho_{A_0}^i - \rho_{B_0}^i + \frac{\left(x_{A_0} - x_s^i \quad y_{A_0} - y_s^i \quad z_{A_0} - z_s^i\right)}{\rho_{A_0}^i}\begin{pmatrix}\Delta x_{AB}\\ \Delta y_{AB}\\ \Delta z_{AB}\end{pmatrix} + \varepsilon_{AB} \tag{6}$$

in which $(\Delta x_{AB}\, \Delta y_{AB}\, \Delta z_{AB})^T$ is the correction amount of the initial baseline $(z_{A_0} - x_{B_0}\, y_{A_0} - y_{B_0}\, z_{A_0} - z_{B_0})^T$ and the pseudo-range equation may be expressed as equation (7):

$$y_\rho^i = C_A^i - C_B^i - (\rho_{A_0}^i - \rho_{B_0}^i) = e^i\begin{pmatrix}\Delta x_{AB}\\ \Delta y_{AB}\\ \Delta z_{AB}\end{pmatrix} + c(\delta_{t_A} - \delta_{t_B}) + \delta\rho_{other} \tag{7}$$

in which $$y_\rho^i$$

is a pseudo-range constant term, and $e^i$ is the direction cosine. When observing n satellites synchronously, the pseudo-range single-difference equation may be expressed as equation (8):

$$\begin{pmatrix}y_\rho^1\\ \vdots\\ y_\rho^n\end{pmatrix}_{AB} = \begin{pmatrix}e^1\\ \vdots\\ e^n\end{pmatrix}_{AB}\begin{pmatrix}\Delta x_{AB}\\ \Delta y_{AB}\\ \Delta z_{AB}\end{pmatrix} + \begin{pmatrix}1\\ \vdots\\ 1\end{pmatrix}c(\delta_{t_{RA}} - \delta_{t_{RB}}) + \varepsilon \tag{8}$$

The carrier phase single-difference equation may be expressed as equation (9):

$$\begin{pmatrix}y_\varphi^1\\ \vdots\\ y_\varphi^n\end{pmatrix}_{AB} = \frac{1}{\lambda}\begin{pmatrix}e^1\\ \vdots\\ e^n\end{pmatrix}_{AB}\begin{pmatrix}\Delta x_{AB}\\ \Delta y_{AB}\\ \Delta z_{AB}\end{pmatrix} + \frac{1}{\lambda}\begin{pmatrix}1\\ \vdots\\ 1\end{pmatrix}_{n\times1}c(\delta_{t_{RA}} - \delta_{t_{RB}}) - \begin{pmatrix}N_{AB}^1\\ \vdots\\ N_{AB}^n\end{pmatrix} + \varepsilon \tag{9}$$

Based on the pseudo-range single-difference equation and the carrier phase single-difference equation, the between-satellites difference of the same reference satellite $S_j$ may be made to obtain the pseudo-range double-difference linear equation and the carrier double-difference equation, which can further eliminate the clock error of the receiver.

The expression of the pseudo-range double-difference linear equation may be as shown in equation (10):

$$\begin{pmatrix}y_\rho^{1j}\\ \vdots\\ y_\rho^{kj}\end{pmatrix} = \begin{pmatrix}e^{1j}\\ \vdots\\ e^{kj}\end{pmatrix}\begin{pmatrix}\Delta x_{AB}\\ \Delta y_{AB}\\ \Delta z_{AB}\end{pmatrix} + \varepsilon \tag{10}$$

The expression of the carrier double-difference equation may be expressed as shown in equation (11):

$$\begin{pmatrix} y_\varphi^{1j} \\ \vdots \\ y_\varphi^{kj} \end{pmatrix} = \frac{1}{\lambda} \begin{pmatrix} e^{1j} \\ \vdots \\ e^{kj} \end{pmatrix} \begin{pmatrix} \Delta x_{AB} \\ \Delta y_{AB} \\ \Delta z_{AB} \end{pmatrix} - \begin{pmatrix} N_{AB}^{1j} \\ \vdots \\ N_{AB}^{kj} \end{pmatrix} + \varepsilon \qquad (11)$$

Thus, the pseudo-range double-difference linear equation may be written as equation (12):

$$y_\rho = E\Delta b + \varepsilon_\rho \qquad (12)$$

in which $y_\rho$ is the pseudo-range constant term; E is the direction cosine matrix; $\Delta b$ is the baseline length; and $\varepsilon_\rho$ is the pseudo-range error term.

The carrier double-difference equation may be written as equation (13):

$$y_{\varphi_1} = \frac{1}{\lambda} E\Delta b - N_{L_1} + \varepsilon_\varphi \qquad (13)$$

in which $y_{\varphi_1}$ is the carrier constant term; $\lambda$ is the carrier wavelength; E is the direction cosine matrix; $\Delta b$ is the baseline length; $N_{L_1}$ is the ambiguity of whole cycles at the frequency points L1; and $\varepsilon_\rho$ is the carrier error term.

In the embodiments of the present application, the first long-wave observation combination and the second long-wave observation combination may be obtained. It can be understood that measurements at high precision baselines may be made by obtaining accurate ambiguities $$N_{AB}^{ij}$$

of whole cycles. The carrier wavelength may be expanded by linear combination using the multiple frequency observations provided by GNSS, so that the search space for the ambiguity of whole cycles can be sparse, which can reduce the search workload and reduce the calculation time. Therefore, the first long-wave observation combination and the second long-wave observation combination after the linear combination can be obtained. It can be understood that, in order to calculate the subsequent short-wave double-difference ambiguity of whole cycles, the first long-wave observation combination and the second long-wave observation combination need to satisfy a non-linear relationship.

In order to ensure the integer property of the ambiguity of whole cycles, the combination coefficients $\alpha$ and $\beta$ of the first long-wave observation combination and the second long-wave observation combination needs to be integers, in which the wavelength of the combination equation may be expressed as equation (14):

$$\frac{1}{\lambda_{mix}} = \frac{\alpha f_1 + \beta f_2}{c} = \alpha \frac{1}{\lambda_1} + \beta \frac{1}{\lambda_2} \qquad (14)$$

A list of combinations that may be used may be:

| Frequency point | | | | Relative noise $\varepsilon_{mix}$/ | Relative ionospheric |
|---|---|---|---|---|---|
| $\alpha$ | $\beta$ | $\lambda_{mix}$ (m) | $\lambda_{mix}/\lambda_1$ | cycle | $\Delta_{ion}$/cycle |
| 1 | 0 | 0.190 | 1.00 | 1.00 | 1.00 |
| 0 | 1 | 0.244 | 1.28 | 1.17 | 1.65 |
| 1 | −1 | 0.862 | 4.53 | 1.54 | −0.65 |
| −1 | 2 | 0.341 | 1.79 | 2.54 | 2.29 |
| −2 | 3 | 0.565 | 2.96 | 4.04 | 2.94 |
| −3 | 4 | 1.628 | 8.56 | 5.56 | 3.59 |
| 4 | −5 | 1.832 | 9.62 | 7.08 | −4.23 |
| −7 | 9 | 14.65 | 77.0 | 12.6 | 7.82 | in which the relative noise may be expressed as equation (15):

$$\varepsilon_{mix} = \sqrt{\alpha^2 \varepsilon_1^2 + \beta^2 \varepsilon_2^2} \qquad (15)$$

The relative ionospheric error may be expressed as equation (16):

$$\Delta_{ion} = \alpha + \beta \frac{f_1^2}{f_2^2} \qquad (16)$$

It can be seen that the noise of a single observation equation is amplified after the linear combination, and thus the first long-wave observation combination and the second long-wave observation combination can only be used for search and determination of the ambiguity of whole cycles. The final baseline calculation may be performed more accurately based on the short-wave double-difference ambiguity of whole cycles determined by the first ambiguity of whole cycles of the first long-wave observation combination and the second ambiguity of whole cycles of the second long-wave observation combination, so as to more accurately measure the relative position of the spacecraft.

In some embodiments, the first long-wave observation combination may be $\varphi_1-\varphi_2$, and the second long-wave observation combination may be $-3\varphi_1+4\varphi_2$. Based on equation (13) and equation (14), it can be seen that the long-wave measurement equation corresponding to $\varphi_1-\varphi_2$ may be equation (17):

$$y_{(1,-1)} = \varphi_{A_1} - \varphi_{A_2} = \left( \frac{1}{\lambda_1} - \frac{1}{\lambda_2} \right) E\Delta b - N_{L(1,-1)} + \varepsilon_{(1,-1)} \qquad (17)$$

The long-wave measurement equation corresponding to $-3\varphi_1+4\varphi_2$ may be equation (18):

$$y_{(-3,4)} = -3\varphi_{A_1} + 4\varphi_{A_2} = \left( \frac{-3}{\lambda_1} + \frac{4}{\lambda_2} \right) E\Delta b - N_{L(-3,4)} + \varepsilon_{(-3,4)} \qquad (18)$$

in which the combined ambiguity of the whole cycles to be detected may be expressed as equation (19):

$$N_{L(1,-1)} = N_{L_1} - N_{L_2} \qquad (19)$$

$$N_{L(-3,4)} = -3N_{L_1} + 4N_{L_2}$$

The double-difference ambiguity of the whole cycles search may be performed according to the pseudo-range double-difference linear equation and carrier double-difference equation established in advance above to determine a plurality of first ambiguities of the whole cycles to be detected of the first long-wave observation combination $(\varphi_1-\varphi_2)$ and a plurality of second ambiguities of the whole cycles to be detected of the second long-wave observation combination $(-3\varphi_1+4\varphi_2)$.

It can be understood that a plurality of ambiguities of the whole cycles to be detected may be obtained through search for each of the long-wave observation combinations, and a unique correct ambiguity of the whole cycles that meets the preset ambiguity of the whole cycles condition may be determined from the plurality of ambiguities of the whole cycles to be detected, so as to ensure the search accuracy of the ambiguity of the whole cycles. Herein, the preset ambiguity of the whole cycles condition may be that a channel residual corresponding to the ambiguity of the whole cycles is in a preset residual interval, and may also be that a residual sum of squares corresponding to the ambiguity of the whole cycles satisfies a preset relationship, etc., which is not specifically limited herein and can be set according to actual situations.

After the correct first ambiguity of the whole cycles $(N_{L(1,-1)r})$ and the correct second ambiguity of the whole cycles $(N_{L(-3,4)r})$ are determined, the short-wave double-difference ambiguity $N_{L_1}$ of the whole cycles at the frequency point L1 can be obtained, and the expression thereof can be as shown in equation (20):

$$N_{L_1} = 4N_{L(1,-1)r} + N_{L(-3,4)r} \qquad (20)$$

The relative position of the spacecraft may be measured according to the short-wave double-difference ambiguity of whole cycles. Exemplarily, a distance between the receiver A and a navigation satellite may be determined according to the short-wave double-difference ambiguity of the whole cycles between the receiver A and the navigation satellite, and further a position of the receiver A may be determined according to distances between the receiver A and a plurality of navigation satellites. Similarly, a position of a receiver B may be determined, and further a relative position of the receiver A and the receiver B may be measured based on the position of the receiver A and the position of the receiver B.

Optionally, in some embodiments, Step 102 above may include:

acquiring, under a condition that original observation data is received, an initial calculated point and an ephemeris calculation based on pseudo-range single-point positioning to obtain position coordinates respectively between each of the navigation satellites of P navigation satellites and a receiver, in which P is an integer greater than 1;

determining elevation angles of the navigation satellites according to the position coordinates respectively between each of the navigation satellites and the receiver;

determining a priori variance of observation values and a reference navigation satellite according to the elevation angles of the navigation satellites;

obtaining a covariance matrix of the priori variance according to the priori variance and the reference navigation satellite;

obtaining an observation weight matrix based on the covariance matrix;

calculating a first baseline vector, a first channel residual and a weighted variance based on the observation weight matrix and the pseudo-range double-difference linear equation to determine a first search interval; and performing the double-difference ambiguity of whole cycles search in the first search interval according to the carrier double-difference equation, and determining the N first ambiguities of whole cycles to be detected of the first long-wave observation combination and the M second ambiguities of whole cycles to be detected of the second long-wave observation combination.

In this embodiment, GNSS, after receiving the original observation data, may acquire the initial calculated point and the ephemeris calculation based on pseudo-range single-point positioning to obtain position coordinates respectively between different navigation satellites and the receiver, and further calculate the elevation angles of each of the navigation satellites. It can be understood that the observation data with a smaller elevation angle has poorer quality. The observation data of a navigation satellite with a greater elevation angle may be given a higher weight through data weighting, and thus the influence of a low-precision observation value on the relative position measurement can be reduced through the observation value weighting. An improved sine function model based on the elevation angle is used to describe the influence of the elevation angle on the carrier observation quality and calculate the prior variance of the observation value, and the prior variance of the observation value may be as shown in equation (21):

$$\sigma_i^2 = a^2 + b^2/\sin^2\left(ele_R^i\right) \qquad (21)$$

In which the empirical values are used to determine that a=4 mm and b=3 mm. It may be assumed that the navigation satellite with the greatest elevation angle is the reference satellite. If the reference satellite for the prior-variance equation is $S_r$, and $S_{1, 2, \ldots, k}$ is a non-reference satellite, the covariance matrix of the prior-variance equation may be as shown in equation (22):

$$Z = \begin{bmatrix} \sigma_1^2 + \sigma_r^2 & \sigma_r^2 & \cdots & \sigma_r^2 \\ \sigma_r^2 & \sigma_2^2 + \sigma_r^2 & & \vdots \\ \vdots & & \ddots & \sigma_r^2 \\ \sigma_r^2 & \cdots & \sigma_r^2 & \sigma_k^2 + \sigma_r^2 \end{bmatrix} \qquad (22)$$

The observation weight matrix may be obtained based on the covariance matrix, and the observation weight matrix may be as shown in equation (23):

$$W = Z^{-1} \qquad (23)$$

A first baseline vector $\Delta \hat{b}$, a first channel residual $\hat{v}$ and a weighted variance $$\sigma_0^2$$

with low precision may be calculated based on the observation weight matrix and the pseudo-range double-difference linear equation through Least Square Method.

$$\Delta \hat{b} = (E^T W E)^{-1} E^T W y_\rho \qquad (24)$$

$$\hat{v} = y_\rho - E \Delta \hat{b}$$

$$\sigma_0^2 = \frac{\hat{v}^T W \hat{v}}{n-4}$$

Then the covariance matrix of the baseline vector may be:

$$Z_{\Delta \hat{b}} = \sigma_0^2 (E^T W E)^{-1} E^T W W^T E (E^T W E) = \begin{pmatrix} \sigma_{\Delta x, \Delta x} & \sigma_{\Delta x, \Delta y} & \sigma_{\Delta x, \Delta z} \\ \sigma_{\Delta y, \Delta x} & \sigma_{\Delta y, \Delta y} & \sigma_{\Delta y, \Delta z} \\ \sigma_{\Delta z, \Delta x} & \sigma_{\Delta z, \Delta y} & \sigma_{\Delta z, \Delta z} \end{pmatrix} \qquad (25)$$

Based on this, $\Delta \hat{b}$ may be used as the center to construct a cuboid for the first search space for the ambiguity of whole cycles, in which the boundaries of the cuboid may be:

$$\sum = \prod ([-T\sigma_{\Delta x}\ T\sigma_{\Delta x}],\ [-T\sigma_{\Delta y}\ T\sigma_{\Delta y}],\ [-T\sigma_{\Delta z}\ T\sigma_{\Delta z}]) \qquad (26)$$

in which in the actual treating processes, it may be determined that T=2.4, and there may be a probability of 95.2% covering the correct ambiguity of whole cycles.

The double-difference ambiguity of whole cycles search may be performed in the first search interval according to the carrier double-difference equation, and the N first ambiguities of whole cycles to be detected of the first long-wave observation combination and the M second ambiguities of whole cycles to be detected of the second long-wave observation combination may be determined.

In this embodiment, the first search interval may be determined from the calculated first baseline vector, first channel residual and weighted variance, and the search range of the ambiguity of whole cycles may be limited in a relatively small range in advance, which can further reduce the search workload, reduce the calculation time, and improve the real-time performance.

It can be understood that if the correct ambiguity of whole cycles is not found in the first search interval, the search interval may be expanded on the basis of the first search interval to obtain a second search interval, and the double-difference ambiguity of whole cycles search may be performed in the second search interval according to the carrier double-difference equation.

Optionally, in some embodiments, each of N second channel residuals corresponding to the N first ambiguities of whole cycles to be detected is in a preset residual filtering interval.

In this embodiment, for example, the first long-wave observation combination may be $\varphi_1 - \varphi_2$, and the second long-wave observation combination may be $-3\varphi_1 + 4\varphi_2$. A residual filtering interval may be preset for the first long-wave observation combination $\varphi_1 - \varphi_2$ in which the residual filtering interval may be $(-4\sigma, 4\sigma)$, so as to exclude a first ambiguity of whole-cycles to be detected of the first long-wave observation combination $\varphi_1 - \varphi_2$ with the second channel residual being outside $\pm 4\sigma$. In this way, the search space for the ambiguity of whole-cycles can be further reduced.

It can be understood that due to the high error magnification of the second long-wave observation combination $-3\varphi_1 + 4\varphi_2$, when the pseudo-range error is greater, the preset filtering may filter out the correct ambiguity of whole-cycles, while the wavelength of the second long-wave observation combination $-3\varphi_1 + 4\varphi_2$ may reach 1.68 m, and the search space thereof is more sparse than that of the first long-wave observation combination $\varphi_1 - \varphi_2$, and thus the second ambiguity of whole-cycles to be detected of the second long-wave observation combination $-3\varphi_1 + 4\varphi_2$ may not be filtered.

Optionally, in some embodiments, Step 103 above may include:

determining Q residual sums of squares corresponding to Q target ambiguities of whole cycles to be detected, in which Q is an integer greater than 1;

determining a minimum residual sum of squares and a sub-minimum residual sum of squares of the Q residual sums of squares; and determining the target ambiguity of whole cycles to be detected corresponding to the minimum residual sum of squares as a target ambiguity of whole cycles under a condition that a ratio of the sub-minimum residual sum of squares to the minimum residual sum of squares is greater than a preset first detection threshold value;

in which the target ambiguity of whole cycles is the first ambiguity of whole cycles under a condition that the Q target ambiguities of whole cycles to be detected are the N first ambiguities of whole cycles to be detected; and the target ambiguity of whole cycles is the second ambiguity of whole cycles under a condition that the Q target ambiguities of whole cycles to be detected are the M second ambiguities of whole cycles to be detected.

It can be understood that the residual expression for the long-wave observation combination $\alpha \varphi_1 + \beta \varphi_2$ may be as shown in equation (27):

$$\hat{v}_i = y_{(\alpha,\beta)} - \left( \frac{\alpha}{A_1} + \frac{\beta}{\lambda_2} \right) E \Delta \hat{b}_i - N_{L(\alpha,\beta)_i} \qquad (27)$$

Thereby, the residual sums of squares corresponding to the target ambiguities of whole cycles to be detected may be:

$$\sigma_i^2 = \frac{\hat{v}_i^T W \hat{v}_i}{n-4} \qquad (28)$$

A plurality of residual sums of squares may be ranked from small to large to determine a minimum residual sum of squares $$\sigma_{min\ 1}^2$$

and a sub-minimum residual sum of squares $$\sigma_{min\ 2}^2,$$

and a first-time ratio detection is performed on the minimum residual sum of squares $$\sigma_{min\ 1}^2$$

and the sub-minimum residual sum of squares $$\sigma^2_{min2}:$$

$$\text{ratio} = \frac{\sigma^2_{min2}}{\sigma^2_{min1}} > \text{threshold} \qquad (29)$$

in which the preset first check threshold threshold may be set according to actual situations, for example, the first detection threshold threshold=3.

The target ambiguity of whole cycles to be detected corresponding to the minimum residual sum of squares may be determined as the correct target ambiguity of whole cycles under a condition that a ratio of the sub-minimum residual sum of squares $$\sigma^2_{min2}$$

to the minimum residual sum of squares $$\sigma^2_{min1}$$

is greater than a preset first detection threshold value.

Optionally, in some embodiments, after the minimum residual sum of squares and the sub-minimum residual sum of squares of the Q residual sums of squares are determined, the method for measuring the relative position of the spacecraft based on GNSS difference may further include:

ranking the Q residual sums of squares from small to large under a condition that the ratio of the sub-minimum residual sum of squares to the minimum residual sum of squares is less than or equal to the preset first detection threshold value; and determining the target ambiguity of whole cycles to be detected corresponding to the minimum residual sum of squares as the target ambiguity of whole cycles under a condition that a ratio of a $k^{th}$ residual sum of squares to the minimum residual sum of squares is greater than a preset second detection threshold value, in which k is an integer greater than 1 and k is less than or equal to Q.

In this embodiment, a second-time ratio detection may be performed if the ratio of the sub-minimum residual sum of squares to the minimum residual sum of squares is less than or equal to the first detection threshold, that is, the minimum residual sum of squares $$\sigma^2_{min1}$$

and the sub-minimum residual sum of squares $$\sigma^2_{min2}$$

fails the first-time ratio detection.

Exemplarily, the residual sums of squares may be ranked from small to large $$\sigma^2_{min1}, \sigma^2_{min2}...\sigma^2_{min k}...\sigma^2_{min n},$$

and the ambiguity $N_{L(\alpha,\beta)1 \to k}$ of whole cycles corresponding to the first k residual sums of squares are used, satisfying:

$$ra = \frac{\sigma^2_{min(k+1)}}{\sigma^2_{min1}} > \text{th\_long} \qquad (30)$$

in which the preset second detection threshold th_long may be set according to the actual situations, for example, the second detection threshold th_long=4. In addition, k may be set according to actual conditions, which is not specifically limited herein.

The target ambiguity of whole cycles to be detected corresponding to the minimum residual sum of squares may be determined as the correct target ambiguity of whole cycles under the condition that the ratio of the $k^{th}$ residual sum of squares to the minimum residual sum of squares is greater than the preset second detection threshold value.

In some examples, if the target ambiguities of whole cycles to be detected fails the two ratio detections, it can be indicated that the target ambiguities of whole cycles to be detected do not include a correct calculation. In this case, the search interval may be expanded, a corresponding target ambiguity of whole cycles to be detected may be re-determined, and the ratio detection is performed again until it passes.

Optionally, in some embodiments, Step 104 above may include:

determining a short-wave double-difference ambiguity of whole cycles to be detected and a third channel residual corresponding to the short-wave double-difference ambiguity of whole cycles to be detected according to the first ambiguity of whole cycles and the second ambiguity of whole cycles;

determining the short-wave double-difference ambiguity of whole cycles to be detected as the short-wave double-difference ambiguity of whole cycles under a condition that the third channel residual is in a preset residual detection interval; and measuring the relative position of the spacecraft according to the short-wave double-difference ambiguity of whole cycles.

In order to further improve the precision of relative position measurement, the correct first ambiguity of whole cycles and the correct second ambiguity of whole cycles may be determined, and then the short-wave double-difference ambiguity of whole cycles to be detected and the third channel residual corresponding to the short-wave double-difference ambiguity of whole cycles to be detected may be determined according to the first ambiguity of whole cycles and the second ambiguity of whole cycles. In this case, a significance detection needs to be performed on the third channel residual for final confirmation. If it passes, it can be considered that the short-wave double-difference ambiguity of whole cycles to be detected is the correct short-wave double-difference ambiguity of whole cycles.

Exemplarily, it may be determined whether the third channel residual is in the preset residual detection interval. If the third channel residual is in the preset residual detection interval, the short-wave double-difference ambiguity of whole cycles to be detected may be determined as the short-wave double-difference ambiguity of whole cycles. Herein, the preset residual detection interval can be set in combination with the actual situations. For example, the third channel residual may be a non-combined channel residual $\varphi_1$, and the preset residual detection interval may be $(-3\sigma, 3\sigma)$.

In some examples, if the third channel residual is not in the preset residual detection interval, it can be indicated that the short-wave double-difference ambiguity of whole cycles to be detected is not the correct calculation. In this case, the search interval may be expanded, and the ambiguity of whole cycles search may be performed again until the correct short-wave double-difference ambiguity of whole cycles is obtained finally, so as to measure the relative position of the spacecraft.

In order to facilitate understanding of the method for measuring the relative position of the spacecraft based on GNSS difference according to the above embodiments, the above method for measuring the relative position of the spacecraft based on GNSS difference is described below in one specific scenario embodiment. FIG. 2 shows a flow diagram of a scenario embodiment of the above method for measuring the relative position of the spacecraft based on GNSS difference.

As shown in FIG. 2, for example, the first long-wave observation combination may be $\varphi_1-\varphi_2$, and the second long-wave observation combination may be $-3\varphi_1+4\varphi_2$ in this scenario embodiment.

GNSS, after receiving the original observation data, may acquire the initial calculated point and the ephemeris calculation based on pseudo-range single-point positioning to obtain position coordinates respectively between different navigation satellites and the receiver, further calculate the elevation angles of each of the navigation satellites, weight the observation values according to the elevation angles, and determine the prior variance of the observation value. According to the prior variance and the reference navigation satellite with the greatest elevation angle, the covariance matrix of the priori variance is obtained, and the observation weight matrix is obtained based on the covariance matrix. Then the first baseline vector, the first channel residual and the weighted variance may be calculated based on the observation weight matrix and the pseudo-range double-difference linear equation to determine the first search interval. Moreover, the double-difference ambiguity of whole cycles search may be performed in the first search interval according to the carrier double-difference equation, and a set of unknown numbers of whole cycles for detection for $\varphi_1-\varphi_2$ and $-3\varphi_1+4\varphi_2$ (i.e., the N first ambiguities of whole cycles to be detected and the M second ambiguities of whole cycles to be detected).

A first-time ratio detection is performed on the set of unknown numbers of whole cycles for detection for $\varphi_1-\varphi_2$ and $-3\varphi_1+4\varphi_2$. If it passes, the respective correct ambiguities of whole cycles can be determined, and if it fails, a second-time ratio detection is required. If the second-time ratio detection passes, the correct ambiguities of whole cycles can be determined, and if the second-time ratio detection fails, the detection threshold can be increased in this case, and the group to be detected is expanded (i.e., the search interval can be expanded on the basis of the first search interval to obtain the second search interval, and the double-difference ambiguity of whole cycles search can be performed again in the second search interval), until the respective correct ambiguities of whole cycles of $\varphi_1-\varphi_2$ and $-3\varphi_1+4\varphi_2$ are determined.

The short-wave double-difference ambiguity of whole cycles to be detected and the non-combined channel residual $\varphi_1$ (i.e., the third channel residual) corresponding to the short-wave double-difference ambiguity of whole cycles to be detected may be obtained based on the respective correct ambiguities of whole cycles of $\varphi_1-\varphi_2$ and $-3\varphi_1+4\varphi_2$. If the non-combined channel residual $\varphi_1$ is in $(-3\sigma, 3\sigma)$ (i.e., the preset residual detection interval), the short-wave double-difference ambiguity of whole-cycles to be detected can be determined as the short-wave double-difference ambiguity of whole-cycles. In this case, a precise baseline may be determined. If non-combined channel residual $\varphi_1$ is not in $(-3\sigma, 3\sigma)$, the detection threshold can be increased and the set to be detected can be expanded (i.e., the search interval can be expanded on the basis of the first search interval to obtain the second search interval, and the double-difference ambiguity of whole cycles search can be performed again in the second search interval) until the non-combined channel residual $\varphi_1$ is in $(-3\sigma, 3\sigma)$ It can be understood that after the precise baseline is determined, the non-combined channel residual $\varphi_1$ can be updated to the first channel residual. When a subsequent relative position measurement is performed, the updated channel residual can be used as the basis of the search interval, so as to further reduce the search workload and improve the real-time performance.

Figure 3:
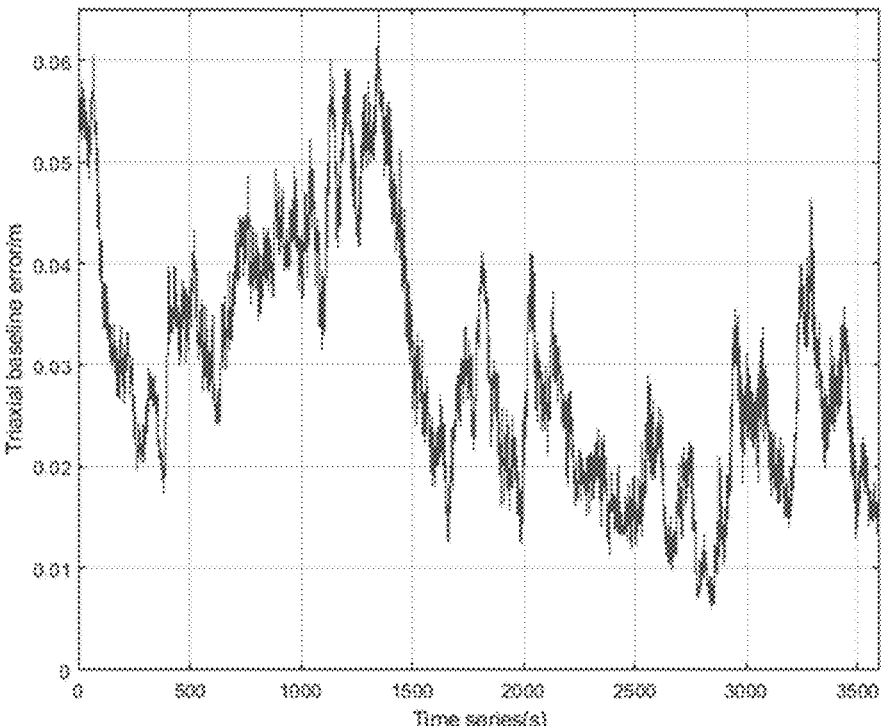
FIG. 3 shows a baseline length precision fixed based on a long-wave double-difference ambiguity of whole cycles.
Figure 4:
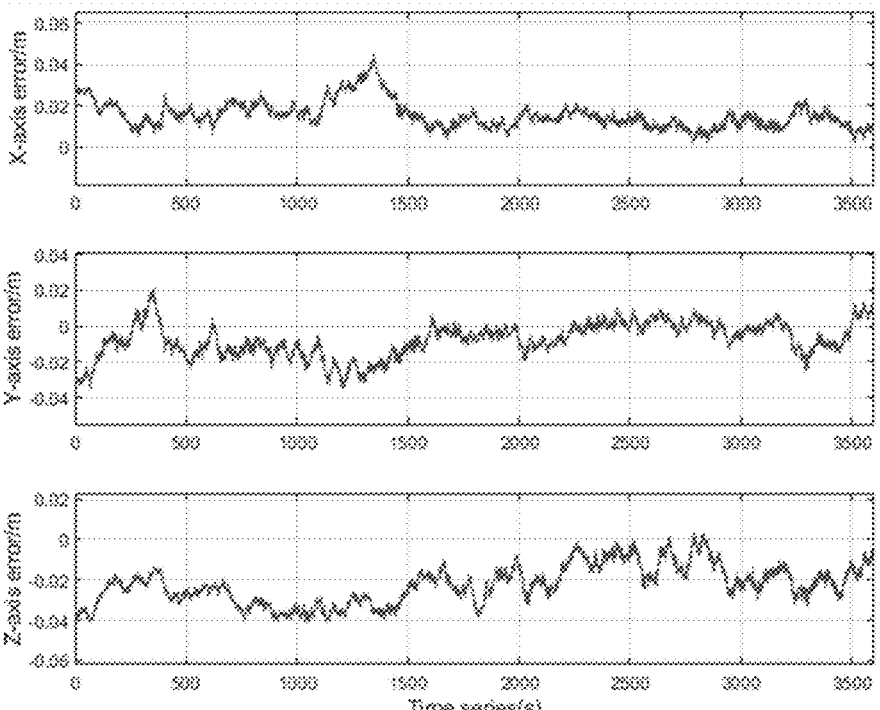
FIG. 4 shows a baseline component precision fixed based on a long-wave double-difference ambiguity of whole cycles.

The method for measuring the relative position of the spacecraft based on GNSS difference according to this scenario embodiment can be verified through relative position measurement experiments. The real-time precise baseline and three-axis components are shown in FIGS. 3 and 4. It can be seen that the baseline vector is stable at centimeter level, which effectively meets the high-precision requirement for spacecraft relative position measurement.

Based on the method for measuring the relative position of the spacecraft based on GNSS difference according to the above embodiments, the present application further provides an embodiment of an apparatus for measuring a relative position of a spacecraft based on GNSS difference.

Figure 5:
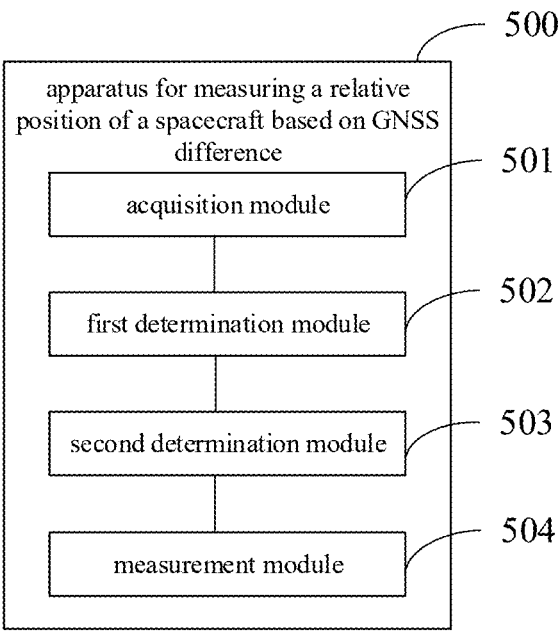
FIG. 5 shows a schematic structural diagram of an apparatus for measuring a relative position of a spacecraft based on GNSS difference according to another embodiment of the present application.

FIG. 5 shows a schematic structural diagram of an apparatus for measuring a relative position of a spacecraft based on GNSS difference according to another embodiment of the present application, and only parts relevant to the embodiments of the present application are shown for the convenience of explanation.

Referring to FIG. 5, an apparatus 500 for measuring a relative position of a spacecraft based on GNSS difference may include:

an acquisition module 501 configured to acquire a first long-wave observation combination and a second long-wave observation combination;

a first determination module 502 configured to perform a double-difference ambiguity of whole cycles search according to a preset pseudo-range double-difference linear equation and a preset carrier double-difference equation, and determine N first ambiguities of whole cycles to be detected of the first long-wave observation combination and M second ambiguities of whole cycles to be detected of the second long-wave observation combination, in which N and M are integers greater than 1;

a second determination module 503 configured to determine a first ambiguity of whole cycles from the N first ambiguities of whole cycles to be detected, and determine a second ambiguity of whole cycles from the M second ambiguities of whole cycles to be detected, in which each of the first ambiguity of whole cycles and the second ambiguity of whole cycles satisfies a preset ambiguity of whole cycles condition; and a measurement module 504 configured to determine a short-wave double-difference ambiguity of whole cycles to measure the relative position of the spacecraft according to the first ambiguity of whole cycles and the second ambiguity of whole cycles.

Optionally, in some embodiments, the first determination module 502 may further be configured to:

acquiring, under a condition that original observation data is received, an initial calculated point and an ephemeris calculation based on pseudo-range single-point positioning to obtain position coordinates respectively between each of the navigation satellites of P navigation satellites and a receiver, in which P is an integer greater than 1;

determining elevation angles of the navigation satellites according to the position coordinates respectively between each of the navigation satellites and the receiver;

determining a priori variance of observation values and a reference navigation satellite according to the elevation angles of the navigation satellites;

obtaining a covariance matrix of the priori variance according to the priori variance and the reference navigation satellite;

obtaining an observation weight matrix based on the covariance matrix;

calculating a first baseline vector, a first channel residual and a weighted variance based on the observation weight matrix and the pseudo-range double-difference linear equation to determine a first search interval; and performing the double-difference ambiguity of whole cycles search in the first search interval according to the carrier double-difference equation, and determining the N first ambiguities of whole cycles to be detected of the first long-wave observation combination and the M second ambiguities of whole cycles to be detected of the second long-wave observation combination.

Optionally, in some embodiments, the first long-wave observation combination may be $\varphi_1-\varphi_2$, and the second long-wave observation combination may be $-3\varphi_1+4\varphi_2$.

Optionally, in some embodiments, each of N second channel residuals corresponding to the N first ambiguities of whole cycles to be detected is in a preset residual filtering interval.

Optionally, in some embodiments, the second determination module 503 may further be configured to:

determining Q residual sums of squares corresponding to Q target ambiguities of whole cycles to be detected, in which Q is an integer greater than 1;

determining a minimum residual sum of squares and a sub-minimum residual sum of squares of the Q residual sums of squares; and determining the target ambiguity of whole cycles to be detected corresponding to the minimum residual sum of squares as a target ambiguity of whole cycles under a condition that a ratio of the sub-minimum residual sum of squares to the minimum residual sum of squares is greater than a preset first detection threshold value;

in which the target ambiguity of whole cycles is the first ambiguity of whole cycles under a condition that the Q target ambiguities of whole cycles to be detected are the N first ambiguities of whole cycles to be detected; and the target ambiguity of whole cycles is the second ambiguity of whole cycles under a condition that the Q target ambiguities of whole cycles to be detected are the M second ambiguities of whole cycles to be detected.

Optionally, in some embodiments, the apparatus 500 for measuring the relative position of the spacecraft based on GNSS difference may further include a detection module, which may include:

ranking the Q residual sums of squares from small to large under a condition that the ratio of the sub-minimum residual sum of squares to the minimum residual sum of squares is less than or equal to the preset first detection threshold value; and determining the target ambiguity of whole cycles to be detected corresponding to the minimum residual sum of squares as the target ambiguity of whole cycles under a condition that a ratio of a $k^{th}$ residual sum of squares to the minimum residual sum of squares is greater than a preset second detection threshold value, in which k is an integer greater than 1 and k is less than or equal to Q.

Optionally, in some embodiments, the measurement module 504 may further configured to:

determining a short-wave double-difference ambiguity of whole cycles to be detected and a third channel residual corresponding to the short-wave double-difference ambiguity of whole cycles to be detected according to the first ambiguity of whole cycles and the second ambiguity of whole cycles;

determining the short-wave double-difference ambiguity of whole cycles to be detected as the short-wave double-difference ambiguity of whole cycles under a condition that the third channel residual is in a preset residual detection interval; and measuring the relative position of the spacecraft according to the short-wave double-difference ambiguity of whole cycles.

It should be noted that the contents such as information interaction and execution process between the above apparatuses/units are based on the same concept as the method embodiment of the present application, and the above apparatuses/units are the apparatuses corresponding to the above method for measuring the relative position of the spacecraft based on GNSS difference. All the implementations in the above method embodiment are applicable to the embodiments of the apparatus, and the specific functions and technical effects thereof can be seen from the method embodiment section for details, which is not be repeated herein.

It can be clearly understood by a person skilled in the art that, for the convenience and brevity of description, the above-mentioned division of various functional units and modules is merely exemplified. In practical applications, the above-mentioned function allocation can be completed by different functional units and modules according to needs, i.e., the internal structure of the apparatus is divided into different functional units or modules so as to complete all or part of the functions described above. The functional units and modules in the embodiments may be integrated in one processing unit, or the units may physically exist separately, or two or more units may be integrated in one unit, and the above integrated unit may be implemented in the form of hardware or a software functional unit. In addition, the specific names of various functional units and modules are merely for facilitating distinction, and are not used to limit the protection scope of the present application. Reference can be made to the corresponding processes in the above method embodiments for the specific working processes of the units and modules in the above-mentioned system, which is not be repeated herein.

Figure 6:
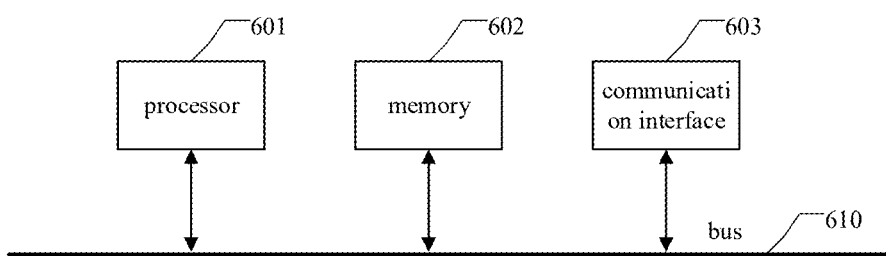
FIG. 6 shows a schematic structural diagram of an electronic device according to yet another embodiment of the present application.

FIG. 6 shows a schematic structural diagram of hardware of an electronic device according to yet another embodiment of the present application.

The device may include a processor 601 and a memory 602 storing programs or instructions.

The processor 601, when executing the programs, implements the steps in any of the method embodiments described above.

Exemplarily, the programs may be divided into one or more modules/units, which are stored in the memory 602 and executed by processor 601 to achieve the present application. One or more modules/units may be a series of program instruction segments capable of completing a particular function, the instruction segments are used to describe the execution processes of the programs in the device.

Specifically, the processor 601 may include a central processing unit (CPU), or an Application Specific Integrated Circuit (ASIC), or one or more integrated circuits that may be configured to implement the embodiments of the present application.

The memory 602 may include a mass memory for storing data or instructions. By way of example, and not limitation, the memory 602 may include a hard disk drive (HDD), a floppy disk drive, a flash memory, an optical disk, a magneto-optical disk, a magnetic tape, or a universal serial bus (USB) drive or a combination of two or more of them. Where appropriate, the memory 602 may include a removable or non-removable (or fixed) medium. Where appropriate, the memory 602 may be internal or external to an integrated gateway disaster recovery device. In a particular embodiment, memory 602 is a non-volatile solid-state memory.

The memory may include a read only memory (ROM), a random access memory (RAM), a magnetic disk storage media device, an optical storage media device, a flash memory device, an electrical, optical or other physical/ tangible memory storage device. Thus, the memory generally includes one or more tangible (non-transitory) readable storage media (for example, memory devices) encoded with software which includes computer-executable instructions, the software, when executed (for example, by one or more processors), is operable to perform the operations described with reference to the methods according to an aspect of the present disclosure.

The processor 601 implements the method in any of the above embodiments by reading and executing the programs or instructions stored in the memory 602.

In one example, the electronic device may further include a communication interface 603 and a bus 604. Herein, the processor 601, the memory 602 and the communication interface 603 are connected and communicate with each other through a bus 604.

The communication interface 603 is mainly configured to realize communication between various modules, apparatuses, units and/or devices in the embodiments of the present application.

The bus 604 includes hardware, software, or both, that couples the components of the online data traffic charging device to each other. By way of example and not limitation, the bus may include an Accelerated Graphics Port (AGP) or other graphics buses, an Enhanced Industry Standard Architecture (EISA) bus, a Front Side Bus (FSB), a Hyper Transport (HT) interconnect, an Industry Standard Architecture (ISA) bus, an infinite bandwidth interconnect, a Low Pin Count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association Local Bus (VLB) bus, or other suitable buses, or a combination thereof. Where appropriate, the bus 404 may include one or more buses. Although the embodiments of the present application describe and illustrate a particular bus, any suitable bus or interconnect is considered in the present application.

In addition, the embodiments of the present application may provide a computer storage medium for implementing the method in the above embodiments. The readable storage medium has programs or instructions stored thereon, in which the programs or instructions, when executed by a processor, implement the method in any of the above embodiments. The readable storage medium can be read by a machine, such as a computer.

The embodiments of the present application further provide a chip, including a processor and a communication interface, in which the communication interface is coupled to the processor, and the processor is configured to run programs or instructions to implement the various processes of the above method embodiments and can achieve the same technical effect. In order to avoid repetition, the description thereof is not be repeated herein.

It should be understood that the chip mentioned in the embodiments of the present application may also be referred to as system-level chip, system chip, chip system, or system on a chip, and the like.

The embodiments of the present application provide a computer program product, which is stored in a readable storage medium, is executed by at least one processor to implement the processes of the above method embodiments, and can achieve the same technical effect. In order to avoid repetition, the description thereof is not repeated herein.

It should be noted that, the present application is not limited to the specific configuration and processing described above and shown in the drawings. For the sake of brevity, a detailed description of the known method is omitted here. In the embodiments, several specific steps are described and shown as examples. However, the method process of the present application is not limited to the specific steps described and shown, and those skilled in the art can make various changes, modifications and additions, or change the sequence of steps after comprehending the gist of the present application.

The functional modules shown in the structural block diagrams may be implemented as hardware, software, firmware, or a combination thereof. When embodied as hardware, the functional block may be, for example, an electronic circuit, an Application Specific Integrated Circuit (ASIC), an appropriate firmware, plug-in, function card, and the like. When implemented as software, elements of the present application are programs or code segments used to perform required tasks. The programs or code segments may be stored in a machine-readable medium, or transmitted on a transmission medium or a communication link through a data signal carried in a carrier wave. A "machine-readable medium" may include any medium that can store or transmit information. An example of the machine-readable media includes an electronic circuit, a semiconductor memory device, a ROM, a flash memory, an erasable ROM (EROM), a floppy disk, a CD-ROM, an optical disk, a hard disk, a fiber optic medium, a radio frequency (RF) link, and the like. The code segments may be downloaded via a computer network such as the Internet, intranet, and the like.

It should also be noted that, according to the exemplary embodiments described in the present application, some methods or systems are described based on a series of steps or apparatuses. However, the present application is not limited to the order of the steps, that is, the steps may be executed in the order described in the embodiments or in orders different from that in the embodiments, or several steps may be executed at the same time.

Aspects of the present disclosure are described above with reference to the flowchart and/or block diagram of the method, apparatus (system), and program product according to the embodiments of the present disclosure. It should be understood that the each block of flowchart illustrations and/or the block diagrams, and a combination of various blocks of the flowchart illustrations and/or the block diagrams may be implemented by the computer program instructions. The programs or instructions may be provided to a processor of a general purpose computer, special purpose computer, or other programmable data processing apparatus to produce a machine, such that the instructions executed via the processor of the computer or other programmable data processing apparatus enable the implementation of the functions/acts specified in one or more blocks of the flow diagrams/block diagrams. Such processor may be but is not limited to a general purpose processor, a special purpose processor, an application specific processor, or a field programmable logic circuit. It should also be understood that each block of the block diagrams and/or the flowchart illustrations, and the combination of blocks of the block diagrams and/or the flowchart illustrations may also be implemented by special purpose hardware that performs specified functions or actions, or by the combination of the special purpose hardware and computer instructions.

The above are only specific implementations of the present application, those skilled in the art may clearly understand that the specific working processes of the above systems, modules and units may be referred to the corresponding processes in the foregoing method embodiments, which is not repeated here for the convenience and brevity of the description. It should be understood that the protection scope of the present application is not limited to this, and any person skilled in the art can easily think of various equivalent modifications or replacements within the technical scope disclosed in the present application, and these modifications or replacements should all be covered within the scope of protection of the present application.

What is claimed is:

1. A method for measuring a relative position of a spacecraft based on GNSS difference, comprising:

acquiring a first long-wave observation combination and a second long-wave observation combination;

performing a double-difference ambiguity of whole cycles search according to a preset pseudo-range double-difference linear equation and a preset carrier double-difference equation, and determining N first ambiguities of whole cycles to be detected of the first long-wave observation combination and M second ambiguities of whole cycles to be detected of the second long-wave observation combination, wherein N and M are integers greater than 1;

determining a first ambiguity of whole cycles from the N first ambiguities of whole cycles to be detected, and determining a second ambiguity of whole cycles from the M second ambiguities of whole cycles to be detected, wherein each of the first ambiguity of whole cycles and the second ambiguity of whole cycles satisfies a preset ambiguity of whole cycles condition; and determining, according to the first ambiguity of whole cycles and the second ambiguity of whole cycles, a short-wave double-difference ambiguity of whole cycles to measure the relative position of the spacecraft;

wherein the first long-wave observation combination and the second long-wave observation combination satisfy a non-linear relationship; the first ambiguity of whole cycles is a unique correct ambiguity of whole cycles in the N first ambiguities of whole cycles to be detected that satisfies the preset ambiguity of whole cycles condition; and the second ambiguity of whole cycles is a unique correct ambiguity of whole cycles in the M second ambiguities of whole cycles to be detected that satisfies the preset ambiguity of whole cycles condition, wherein the performing the double-difference ambiguity of whole cycles search according to the preset pseudo-range double-difference linear equation and the preset carrier double-difference equation, and determining the N first ambiguities of whole cycles to be detected of the first long-wave observation combination and the M second ambiguities of whole cycles to be detected of the second long-wave observation combination comprises:

acquiring, under a condition that original observation data is received, an initial calculated point and an ephemeris calculation based on pseudo-range single-point positioning to obtain position coordinates respectively between each of the navigation satellites of P navigation satellites and a receiver, wherein P is an integer greater than 1;

determining elevation angles of the navigation satellites according to the position coordinates respectively between each of the navigation satellites and the receiver;

determining a priori variance of observation values and a reference navigation satellite according to the elevation angles of the navigation satellites;

obtaining a covariance matrix of the priori variance according to the priori variance and the reference navigation satellite, obtaining an observation weight matrix based on the covariance matrix;

calculating a first baseline vector, a first channel residual and a weighted variance based on the observation weight matrix and the pseudo-range double-difference linear equation to determine a first search interval; and performing the double-difference ambiguity of whole cycles search in the first search interval according to the carrier double-difference equation, and determining the N first ambiguities of whole cycles to be detected of the first long-wave observation combination and the M second ambiguities of whole cycles to be detected of the second long-wave observation combination.

2. The method according to claim 1, wherein the first long-wave observation combination is $\varphi_1-\varphi_2$, and the second long-wave observation combination is $-3\varphi_1+4\varphi_2$;

wherein $\varphi_1$ is a carrier phase measurement value of a navigation satellite observed at a frequency point L1 received by the receiver; and $\varphi_2$ is a carrier phase measurement value of the navigation satellite observed at a frequency point L2 received by the receiver.

3. The method according to claim 2, wherein each of N second channel residuals corresponding to the N first ambiguities of whole cycles to be detected is in a preset residual filtering interval.

4. The method according to claim 1, wherein the determining the first ambiguity of whole cycles from the N first ambiguities of whole cycles to be detected, and determining the second ambiguity of whole cycles from the M second ambiguities of whole cycles to be detected comprises:

determining Q residual sums of squares corresponding to Q target ambiguities of whole cycles to be detected, wherein Q is an integer greater than 1;

determining a minimum residual sum of squares and a sub-minimum residual sum of squares of the Q residual sums of squares; and determining the target ambiguity of whole cycles to be detected corresponding to the minimum residual sum of squares as a target ambiguity of whole cycles under a condition that a ratio of the sub-minimum residual sum of squares to the minimum residual sum of squares is greater than a preset first detection threshold value;

wherein the target ambiguity of whole cycles is the first ambiguity of whole cycles under a condition that the Q target ambiguities of whole cycles to be detected are the N first ambiguities of whole cycles to be detected; and the target ambiguity of whole cycles is the second ambiguity of whole cycles under a condition that the Q target ambiguities of whole cycles to be detected are the M second ambiguities of whole cycles to be detected.

5. The method according to claim 4, wherein after the determining the minimum residual sum of squares and the sub-minimum residual sum of squares of the Q residual sums of squares, the method further comprises:

ranking the Q residual sums of squares from small to large under a condition that the ratio of the sub-minimum residual sum of squares to the minimum residual sum of squares is less than or equal to the preset first detection threshold value; and determining the target ambiguity of whole cycles to be detected corresponding to the minimum residual sum of squares as the target ambiguity of whole cycles under a condition that a ratio of a $k^{th}$ residual sum of squares to the minimum residual sum of squares is greater than a preset second detection threshold value, wherein k is an integer greater than 1 and k is less than or equal to Q.

6. The method according to claim 1, wherein the determining, according to the first ambiguity of whole cycles and the second ambiguity of whole cycles, the short-wave double-difference ambiguity of whole cycles to measure the relative position of the spacecraft comprises:

determining a short-wave double-difference ambiguity of whole cycles to be detected and a third channel residual corresponding to the short-wave double-difference ambiguity of whole cycles to be detected according to the first ambiguity of whole cycles and the second ambiguity of whole cycles;

determining the short-wave double-difference ambiguity of whole cycles to be detected as the short-wave double-difference ambiguity of whole cycles under a condition that the third channel residual is in a preset residual detection interval; and measuring the relative position of the spacecraft according to the short-wave double-difference ambiguity of whole cycles.

7. An electronic device, comprising: a processor and a memory storing programs or instructions;

wherein the processor, when executing the programs or the instructions, implements the method according to claim 1.

8. A non-transitory readable storage medium having programs or instructions stored thereon, wherein the programs or instructions, when executed by a processor, implement the method according to claim 1.

\* \* \* \* \*